United States Patent
Noheji et al.

(10) Patent No.: US 8,054,538 B2
(45) Date of Patent: Nov. 8, 2011

(54) RAMAN AMPLIFICATION APPARATUS AND DISTRIBUTED RAMAN AMPLIFICATION SYSTEM AS WELL AS STARTING UP METHOD FOR DISTRIBUTED RAMAN AMPLIFICATION SYSTEM

(75) Inventors: Kiyotoshi Noheji, Kawasaki (JP); Masanori Kondoh, Kawasaki (JP); Miki Onaka, Kawasaki (JP); Togo Fukushi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 326 days.

(21) Appl. No.: 12/365,212

(22) Filed: Feb. 4, 2009

(65) Prior Publication Data

US 2009/0213454 A1 Aug. 27, 2009

(30) Foreign Application Priority Data

Feb. 4, 2008 (JP) .................... 2008-024365

(51) Int. Cl.
 *H01S 3/30* (2006.01)
 *H04B 10/17* (2006.01)
 *H04B 10/12* (2006.01)

(52) U.S. Cl. ........................................ 359/334

(58) Field of Classification Search .............. 359/334
See application file for complete search history.

(56) References Cited

U.S. PATENT DOCUMENTS

| | | | |
|---|---|---|---|
| 6,441,951 B1 | 8/2002 | Tanaka et al. | |
| 6,519,082 B2 * | 2/2003 | Ghera et al. | 359/341.4 |
| 6,683,712 B2 | 1/2004 | Tanaka et al. | |
| 6,862,134 B2 * | 3/2005 | Terahara et al. | 359/334 |
| 7,068,421 B2 | 6/2006 | Tokura et al. | |
| 2004/0032642 A1 | 2/2004 | Imai et al. | |
| 2007/0008610 A1 * | 1/2007 | Eiselt | 359/334 |

FOREIGN PATENT DOCUMENTS

| | | |
|---|---|---|
| JP | 2002-252595 | 9/2002 |
| JP | 2004-80301 | 3/2004 |
| JP | 2004-193640 | 7/2004 |
| WO | WO-02-21204 | 3/2002 |

* cited by examiner

*Primary Examiner* — Eric Bolda
(74) *Attorney, Agent, or Firm* — Fujitsu Patent Center

(57) ABSTRACT

A Raman amplification apparatus includes a pumping light supplying section, a main signal wavelength light level acquisition section, a monitoring signal wavelength light level acquisition section, a function information storage section for storing, as function information, information regarding functions for deriving a noise amount and a gain by Raman amplification with regard to a monitoring signal wavelength light with respect to pumping light power supplied from the pumping light supplying section, and a transmission characteristic derivation section for deriving a transmission characteristic on an optical transmission line based on information acquired by the main signal wavelength light level acquisition section and the monitoring signal wavelength light level acquisition section and the function information stored in the function information storage section, and Raman gain is derived with high accuracy in comparison with the conventional technique.

12 Claims, 12 Drawing Sheets

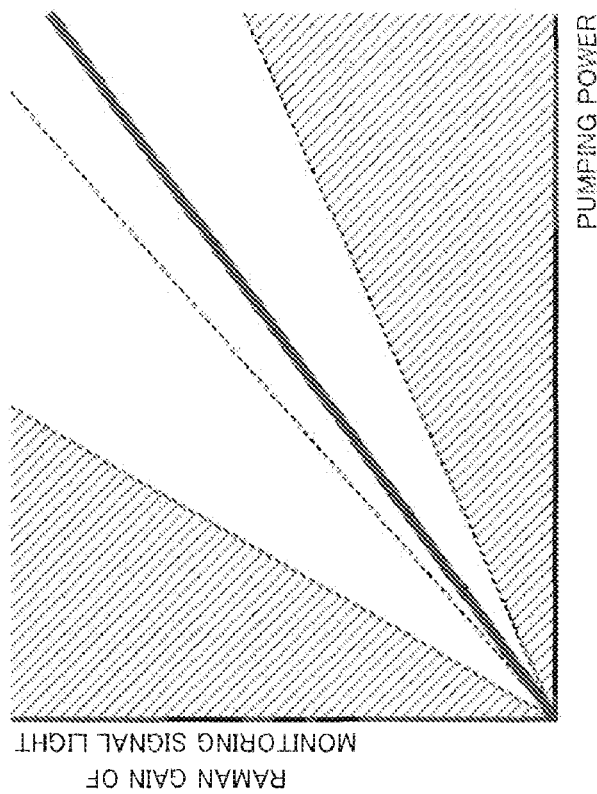
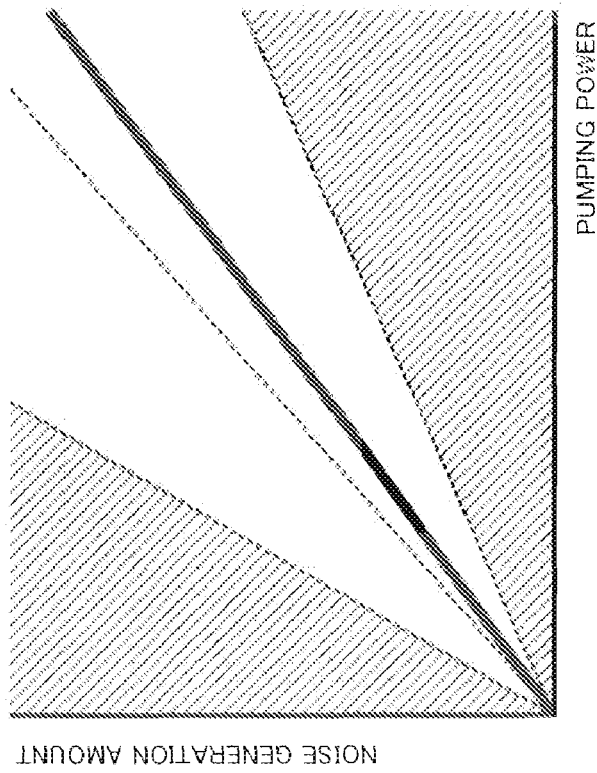

RAMAN AMPLIFICATION APPARATUS AND DISTRIBUTED RAMAN AMPLIFICATION SYSTEM AS WELL AS STARTING UP METHOD FOR DISTRIBUTED RAMAN AMPLIFICATION SYSTEM

CROSS-REFERENCE TO RELATED APPLICATION(S)

This application is based upon and claims the benefit of priority of the prior Japanese Application No. 2008-024365 filed on Feb. 4, 2008 in Japan, the entire contents of which are hereby incorporated by reference.

FIELD

The embodiment(s) discussed herein are related to a Raman amplification apparatus, a distributed Raman amplification system and a starting up method for the distributed Raman amplification system suitable for use with an optical communication system.

BACKGROUND

Demand for an optical communication transmission apparatus is increasing in a context of increase of the communication traffic in recent years. Installation of an optical communication transmission apparatus not only in an optical relay node incorporated in a trunk network but also in a recent local network is advanced actively. Further, an optical network is formed also in a subscriber system. In this manner, the optical communication system has a significant role in the information network in the world. In an optical network, an optical amplification relay is used dominantly which includes a wavelength multiplexing optical amplifier such as an EDFA (Erbium Doped Fiber Amplifier) provided for each of transmission lines so that it implements increase of the capacity and long-distance transmission at a low cost and in high reliability.

In an optical amplification relay system, under the condition that the relay loss is high from such a cause that the transmission line is long, the input level of signal light to an optical amplifier is low. Therefore, there is the possibility that the signal to noise ratio (SN ratio) may degrade, resulting in degradation of the transmission characteristic. As a method for avoiding this, it is effective to apply transmission line distributed Raman amplification which utilizes an amplification action using an effect of induced Raman scattering when pumping light is injected into a transmission line.

A distributed Raman optical amplifier (Distributed Raman Amplification; DRA) has already been put to practical use as an effective implementation method for achieving transmission line distributed Raman amplification. By applying the distribution Raman optical amplifier, the input level to an optical amplifier such as an EDFA or the like increases to increase the SN ratio thereby to improve the transmission characteristic and increase the number of spans which can be transmitted. Further, in the Raman amplification, not optical output fixing control (Automatic Level Control; ALC) but gain fixing control which does not require transmission of wavelength information between nodes must be carried out in order to be ready for dynamic fluctuation of the number of wavelengths.

The gain of Raman amplification can be controlled by increase or decrease of the pumping power. A conventional technique relating to gain fixing control of a DRA is disclosed in Japanese Patent Laid-Open No. 2004-193640 (hereinafter referred to as Patent Document 1). In particular, in Patent Document 1, a technique is disclosed wherein transmission line distributed Raman amplification is carried out by gain fixing control irrespective of such conditions as the gain efficiency of an optical fiber which forms a transmission line and the loss of a connection path or of the signal light level so that the output wavelength characteristic of the Raman amplification is kept fixed. In the technique disclosed in Patent Document 1, it is described to determine a Raman gain utilizing reference light which does not undergo Raman amplification and control pumping light so that the determined Raman gain becomes equal to a predetermined value.

It is to be noted that also techniques disclosed in Patent Documents 2 to 4 given below relate to the present invention.
(Patent Document 2) Japanese Patent Laid-Open No. 2004-80301
(Patent Document 3) pamphlet of International Publication No. 2002/021204
(Patent Document 4) Japanese Patent Laid-Open No. 2002-252595

However, while it is necessary to monitor the optical main signal level inputted through an optical transmission line using a monitor circuit formed from a light reception device and so forth in order to determine the Raman gain, the signal of a result of the monitoring includes not only circuit noise by a monitor circuit section but also noise by the Raman amplification. If such a monitoring result signal which includes noise as just described is used for the gain derivation described above, then this makes a cause of an error in a derived gain value and also may make an obstacle to enhancement of the accuracy of gain control.

SUMMARY

According to an aspect of the embodiment(s), there is provided a Raman amplification apparatus for Raman-amplifying light propagating along an optical transmission line, comprising a pumping light supplying section adapted to supply pumping light for the Raman amplification to the optical transmission line, a main signal wavelength light level acquisition section adapted to acquire information regarding transmission and reception levels of main signal wavelength light transmitted along the optical transmission line, a monitoring signal wavelength light level acquisition section adapted to acquire information regarding transmission and reception levels of monitoring signal wavelength light having a wavelength different from that of the main signal wavelength light and transmitted along the optical transmission line, a function information storage section adapted to store, as function information, information relating to functions for deriving a noise amount and a gain by the Raman amplification regarding the monitoring signal wavelength light with respect to pumping light power supplied from the pumping light supplying section, and a transmission characteristic derivation section adapted to derive a transmission characteristic of the optical transmission line based on the information acquired by the main signal wavelength light level acquisition section and the monitoring signal wavelength light level acquisition section and the function information stored in the function information storage section.

According to another aspect of the embodiment(s), there is provided a distributed Raman amplification system, comprising an optical transmission line, and first and second optical transmission apparatus connected to one end side and the other end side of the optical transmission line, respectively, the distributed Raman amplification system distributed Raman-amplifying light propagating along the optical transmission line, the first optical transmission apparatus including a first optical monitoring signal source adapted to output an optical monitoring signal whose wavelength is set to the outside of a wavelength band of an optical main signal and which is to be transmitted to the second optical transmission apparatus along the optical transmission line, and a first optical monitor adapted to monitor power of the optical main signal transmitted from the first optical transmission apparatus and inputted to the optical transmission line and the optical monitoring signal outputted from the first optical monitoring signal source, the second optical transmission apparatus including a second optical monitor adapted to monitor power of the optical main signal and the optical monitoring signal, in the optical wavelength band, inputted to and received by the second optical transmission apparatus through the optical transmission line, one or both of the first and second optical transmission apparatus including a pumping light supplying section adapted to supply pumping light for the distributed Raman amplification to the optical transmission line, one of the first and second optical transmission apparatus including a main signal wavelength light level acquisition section adapted to acquire information regarding transmission and reception levels of main signal wavelength light transmitted along the optical transmission line between the first and second optical transmission apparatus based on a result of the monitoring from the first and second optical monitors, a monitoring signal wavelength light level acquisition section adapted to acquire information regarding transmission and reception levels of the monitoring signal wavelength light having a wavelength different from that of the main signal wavelength light and transmitted along the optical transmission line between the first and second optical transmission apparatus based on monitoring results from the first and second optical monitors, a function information storage section adapted to store function information for deriving a noise amount and a gain by the Raman amplification regarding the monitoring signal wavelength light with respect to pumping light power supplied from the pumping light supplying section, and a transmission characteristic derivation section adapted to derive a transmission characteristic of the optical transmission line based on the information acquired by the main signal wavelength light level acquisition section and the monitoring signal wavelength light level acquisition section and the function information stored in the function information storage section.

In the Raman amplification apparatus and the distributed Raman amplification system, in whichever state the pumping power is such as in an activated state or in a gain variation state, the noise amount corresponding to the pumping light power can be calculated as a transmission characteristic of the optical transmission line, and the value of the monitoring signal input monitor (reception level of the monitoring signal light) corrected in response to the calculated noise amount can be determined. Further, the Raman gain in the main signal wavelength band can be accurately determined based on the determined value of the monitoring signal input monitor. In particular, derivation of the Raman gain can be carried out with higher accuracy than that in the conventional techniques and the accuracy of the gain fixing control of the transmission line distributed Raman amplification can be enhanced in comparison with that in the conventional technique.

Additional objects and advantages of the embodiment(s) will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

FIG. 5(a) is a view illustrating an example of a relationship of a noise generation amount generated in main signal wavelength light or monitoring signal wavelength light to the power of pumping light, and FIG. 5(b) is a view illustrating an example of a Raman gain characteristic of monitoring signal wavelength light with respect to the power of pumping light;

DESCRIPTION OF THE PREFERRED EMBODIMENTS

In the following, embodiments are described with reference to the drawings.

[A] Description of the First Embodiment

General Configuration

Figure 1:
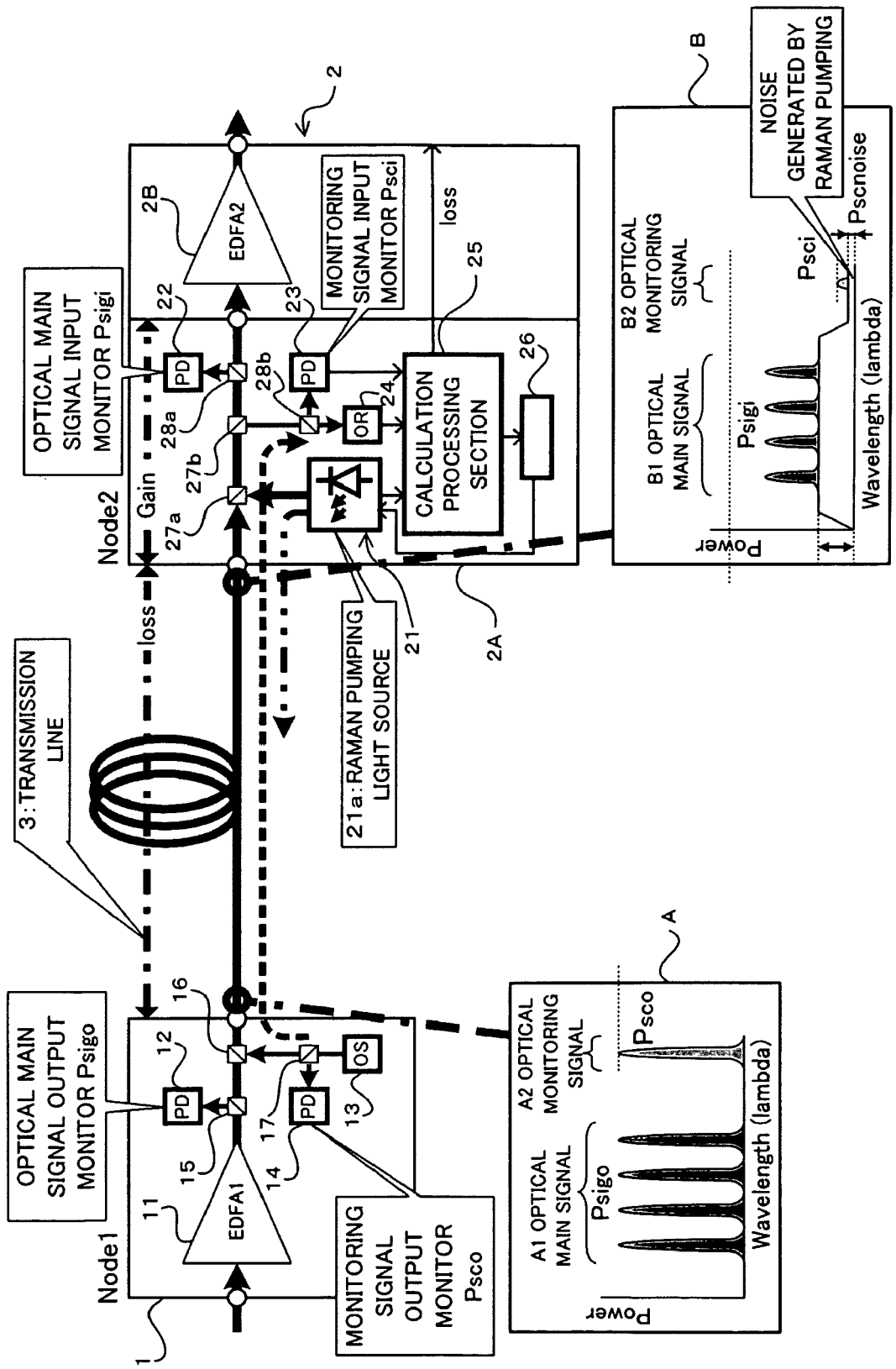
FIG. 1 is a view illustrating a distributed Raman amplification system according to a first embodiment.

FIG. 1 is a view illustrating a distributed Raman amplification system according to a first embodiment. The distributed Raman amplification system shown in FIG. 1 includes an optical transmission line 3, and first and second optical transmission apparatus 1 and 2 connected to one end side and the other end side of the optical transmission line 3, respectively, and carries out distributed Raman amplification for light propagating along the optical transmission line 3.

Further, the first and second optical transmission apparatus 1 and 2 can be configured as relay apparatus or transmission and reception apparatus which form an optical communication system. In FIG. 1, an optical main signal is transmitted from the first optical transmission apparatus 1 to the second optical transmission apparatus 2 through the optical transmission line 3, and the first and second optical transmission apparatus 1 and 2 are configured as a transmission side transmission apparatus and a reception side transmission apparatus, respectively. It is to be noted that a configuration as a reception side apparatus similar to the second optical transmission apparatus 2 is provided also in the first optical transmission apparatus 1, and a configuration as a transmission side apparatus similar to the first optical transmission apparatus 1 can be provided in the second optical transmission apparatus 2.

Here, the optical transmission apparatus 1 includes an EDFA (Erbium Doped Fiber Amplifier) 11, an optical main signal output monitor 12, an optical monitoring signal source 13 and an optical monitoring signal output monitor 14. The EDFA 11 is an optical amplifier for amplifying an inputted optical main signal and is controlled on and off in response to an optical monitoring signal from the optical transmission apparatus serving as an opposing apparatus. It is to be noted that a configuration for transmitting and receiving the optical monitoring signal from the optical transmission apparatus 2 is not shown in FIG. 1.

The optical main signal output monitor (PD; Photo Diode) 12 receives part of the optical main signal amplified by the EDFA 11 through a branching element 15 and monitors optical power Psigo of the optical main signal. Further, the optical monitoring signal source (OS) 13 is a first optical monitoring signal source for outputting the optical monitoring signal to be transmitted to the second optical transmission apparatus 2 through the optical transmission line 3. A multiplexer 16 multiplexes the optical monitoring signal from the optical monitoring signal source 13 with the optical main signal from the branching element 15 and outputs the resulting signal to the optical transmission line 3.

For example, as shown in a block denoted by a reference character A in FIG. 1, the wavelength of an optical monitoring signal A2 is set to a wavelength outside a wavelength band of an optical main signal A1. Therefore, a channel prepared for a main signal need not be used for transmission and reception of the optical monitoring signal, and the distributed Raman amplification system according to the present embodiment does not waist the resource for communication of the optical main signal.

Further, the optical monitoring signal output monitor 14 receives part of the optical monitoring signal outputted from the optical monitoring signal source 13 as an input thereto through a branching element 17 and monitors the power Psco of the optical monitoring signal.

Accordingly, the cooperation between optical main signal output monitor 12 and the optical monitoring signal output monitor 14 implements a function as a first optical monitor for monitoring the power of the optical main signal transmitted from the first optical transmission apparatus 1 and outputted to the optical transmission line 3 and the optical monitoring signal outputted from the first optical monitoring signal source 13.

It is to be noted that results of the monitoring by the optical main signal output monitor 12 and the optical monitoring signal output monitor 14 can be included in the optical monitoring signal to be outputted from the optical monitoring signal source 13 by optical modulation. Consequently, the monitoring results just described can be outputted to the second optical transmission apparatus 2.

Further, the second optical transmission apparatus 2 has a configuration as a Raman amplification apparatus 2A for distribution Raman amplifying light propagating along the optical transmission line and includes an EDFA 2B. Further, the distributed Raman amplification apparatus 2A includes a pumping light supplying section 21, an optical main signal input monitor 22, an optical monitoring signal input monitor 23, an optical monitoring signal reception section 24, a calculation processing section 25 and a control section 26. It is to be noted that, in FIG. 1, reference characters 27a and 27b individually indicate a multiplexer/demultiplexer and reference characters 28a and 28b individually indicate a branching element.

Here, the pumping light supplying section 21 supplies pumping light for distribution Raman amplifying light propagating along the optical transmission line 3 to the optical transmission line 3 and includes a Raman pumping light source 21a and the multiplexer/demultiplexer 27a. The Raman pumping light source 21a outputs Raman pumping light having the power controlled by the control section 26 hereinafter described. The Raman pumping light outputted from the Raman pumping light source 21a is outputted to the optical transmission line 3 through the multiplexer/demultiplexer 27a so as to backwardly pump the optical main signal from the first optical transmission apparatus 1. It is to be noted that, while the configuration as the pumping light supplying section 21 is applied to the optical transmission apparatus 2 in FIG. 1, the configuration as the pumping light supplying section 21 may be applied to the first optical transmission apparatus 1 for forwardly pumping the optical main signal from the first optical transmission apparatus 1 or may be applied to both of the first and second optical transmission apparatus 1 and 2.

Further, the optical main signal input monitor (PD) 22 receives part of light of an optical main signal wavelength band inputted thereto from the optical transmission 3 through the multiplexer/demultiplexers 27a and 27b and the branching element 28a and monitors the power Psigi of the light. Further, the optical monitoring signal input monitor 23 receives the optical monitoring signal outputted from the optical monitoring signal source 13 of the first optical transmission apparatus 1 and transmitted through the optical transmission line 3 through the multiplexer/demultiplexers 27a and 27b and the branching element 28b and monitors the optical power Psci of the optical monitoring signal. It is to be noted that the multiplexer/demultiplexer 27b outputs light having an optical main signal wavelength band from within light inputted thereto from the multiplexer/demultiplexer 27a to the branching element 28a side but outputs light having an optical monitoring signal wavelength band from within the light inputted thereto from the multiplexer/demultiplexer 27a to the branching element 28b side.

Accordingly, the cooperation between the optical main signal input monitor 22 and the optical monitoring signal input monitor 23 described above implements a function as a second optical monitor for monitoring the power of the optical wavelength band of the optical main signal and the optical monitoring signal inputted thereto through the optical transmission line 3. It is to be noted that, while the optical monitoring signal input monitor 23 in FIG. 1 is provided on the outside of the optical monitoring signal reception section 24, the function as the optical monitoring signal input monitor 23 may alternatively be provided in the optical monitoring signal reception section 24.

Further, the optical monitoring signal reception section 24 receives the optical monitoring signal outputted from the optical monitoring signal source 13 described above and can demodulate monitoring information or the like modulated to the optical monitoring signal. For example, the optical monitoring signal reception section 24 can demodulate the optical monitoring signal from the optical monitoring signal source 13 so as to receive the monitoring results by the optical main signal output monitor 12 and optical monitoring signal output monitor 14 of the first optical transmission apparatus 1. It is to be noted that the monitoring results received by the optical monitoring signal reception section 24 as described above are outputted to the calculation section 25.

Further, the calculation processing section 25 receives the monitoring results by the optical main signal output monitor 12 and the optical monitoring signal output monitor 14 from the optical monitoring signal reception section 24 together with the monitoring results from the optical main signal input monitor 22 and the optical monitoring signal input monitor 24, and calculates a Raman gain in an optical main signal wavelength band corresponding to the pumping light power supplied from the pumping light supplying section 21. It is to be noted that a result of the calculation is outputted to the control section 26.

In particular, the calculation processing section 25 described above functions as a main signal wavelength light level acquisition section for acquiring information regarding transmission and reception levels of main signal wavelength light transmitted from the optical transmission apparatus 1 as an opposing apparatus through the optical transmission line 3 based on the monitoring results from the first and second optical monitors 12, 14, 22 and 23. The calculation processing section 25 further functions also as a monitoring signal wavelength light level acquisition section for acquiring information regarding transmission and reception levels of the monitoring signal wavelength light, different from the main signal wavelength, transmitted from the optical transmission apparatus 1 through the optical transmission line 3. It is to be noted that a mode of the calculation of the Raman gain by the calculation section 25 is hereinafter described.

The control section 26 controls the pumping light to be supplied from the pumping light supplying section 21 so that the Raman gain derived by the calculation processing section 25 is fixed. If the number of wavelengths of the optical main signal from the optical transmission apparatus 1 is fluctuated, then the gain characteristic of the Raman amplification is fluctuated. Also in the case wherein the number of wavelengths of the optical main signal is fluctuated in this manner, the control section 26 can control the pumping light power so that the Raman gain calculated by the calculation section 25 is substantially fixed as a feedback element. Therefore, enhancement of the accuracy of pumping light control can be implemented.

Particular Mode of Raman Gain Derivation by the Calculation Processing Section 25

Incidentally, as described above, in order to be ready for dynamic fluctuation of the number of wavelengths, not optical output fixing control (ALC) but gain fixing control (AGC) wherein the wavelength information need not be transferred must be carried out as the gain control of the Raman amplification. The gain is controlled through increase and decrease of the pumping power. In order to control the gain normally optimally, not only the measurement of input and output optical main signal levels (Psigo/Psigi) but also measurement of input and output optical monitoring signal levels (Psco/Psci) for measurement of the transmission line loss (loss) are performed. In short, such four signal levels as just described are measured.

Consequently, by using the four values measured in such a manner as described above, an expression (1) can be assumed as a derivation expression for the gain to be calculated by the calculation processing section 25. It is to be noted that "Loss" in the expression (1) indicates the transmission line loss and can be calculated as the difference of the reception level with respect to the transmission level of the monitoring signal light as given by an expression (2).

$$\text{Gain}=\text{Loss}-(Psigo-Psigi) \quad (1)$$

$$\text{Loss}=Psco-Psci \quad (2)$$

It is to be noted that, although the transmission line loss cannot be calculated using only the input and output levels (Psigo/Psigi) of the optical main signal which undergoes the Raman amplification, the transmission line loss "Loss" can be measured by using the optical transmission and reception levels of the optical monitoring signal which are disposed at a wavelength at which the Raman gain is difficult to obtain. Accordingly, by using the value of the transmission line loss "Loss" as given by the expression (1), it can be assumed that the gain can be derived as the Raman gain of the optical main signal.

However, the level (Psigi) of the input optical main signal acquired by the calculation processing section 25 includes circuit noise generated along a route of a signal originating from the optical main signal in the Raman amplification apparatus 2A (generated in an optical route from a connecting point of the Raman amplification apparatus 2A to the optical transmission line 3 to the optical main signal input monitor 22 and an electric route from the optical main signal input monitor 22 to the calculation processing section 25) and noise components generated along the optical transmission line by the Raman amplification. For example, as shown in a block denoted by a reference character B in FIG. 1, an optical monitoring signal B2 and an optical main signal B1 which come to the second optical transmission apparatus 2 include noise components from an influence of the Raman amplification on the optical transmission line 3.

Figure 2:
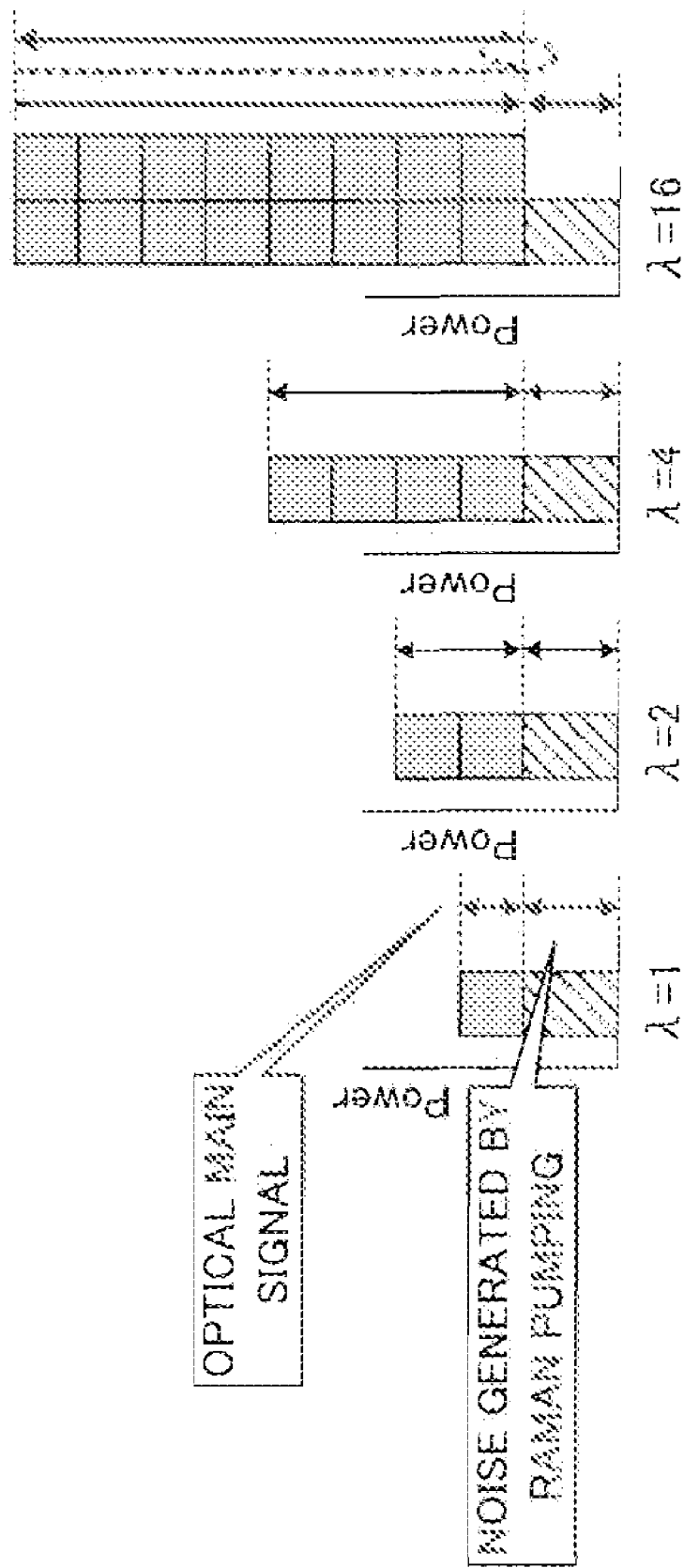
FIG. 2 is a view illustrating an input optical main signal level according to the number of wavelengths of an optical main signal together with a relative relationship between optical main signal power and noise power.

FIG. 2 is a view illustrating the input optical main signal level Psigi corresponding to the number of wavelengths of the optical main signal together with a relative relationship between the optical main signal power and the noise power. The value of the input optical main signal level Psigi acquired by the calculation processing section 25 is equal to the total value of the optical main signal power and the noise power. As shown in FIG. 2, the noise power is substantially fixed irrespective of increase and decrease of the number of wavelengths of the optical main signal. Accordingly, since the optical main signal power is low particularly in a state wherein the number of wavelengths of the optical main signal is small, the influence of an error by the noise power is relatively great. If such an input optical main signal level Psigi as described above is used as it is for gain calculation, then a great gain error is likely to appear on the calculated value.

Figure 3:
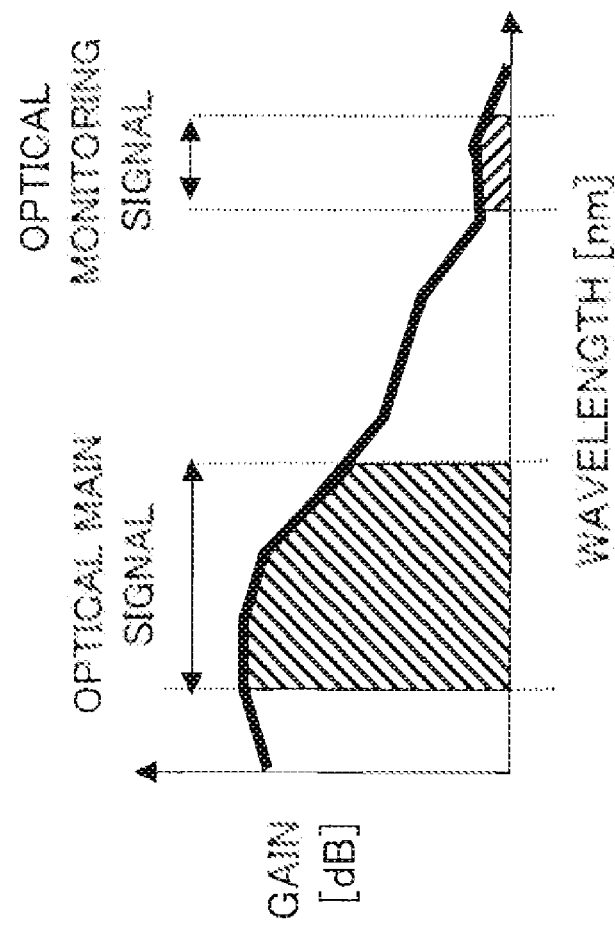
FIG. 3 is a view illustrating a Raman gain wavelength characteristic.

Further, there is the possibility that, even if a wavelength band different from the optical main signal wavelength band is selected for the optical monitoring signal, actually some Raman gain is obtained, for example, as seen from the Raman gain wavelength characteristic in FIG. 3. In this case, since also the value of the transmission line loss calculated as the difference Psco−Psci of the monitor values of the input and output optical monitoring signal levels is displaced from its true value, there is the possibility that an error may appear with the gain value to be determined.

Since, by the error factors described above, an error easily appears with the gain value measured in accordance with the expression (1), enhancement of the accuracy of the gain control is obstructed.

Figure 4:
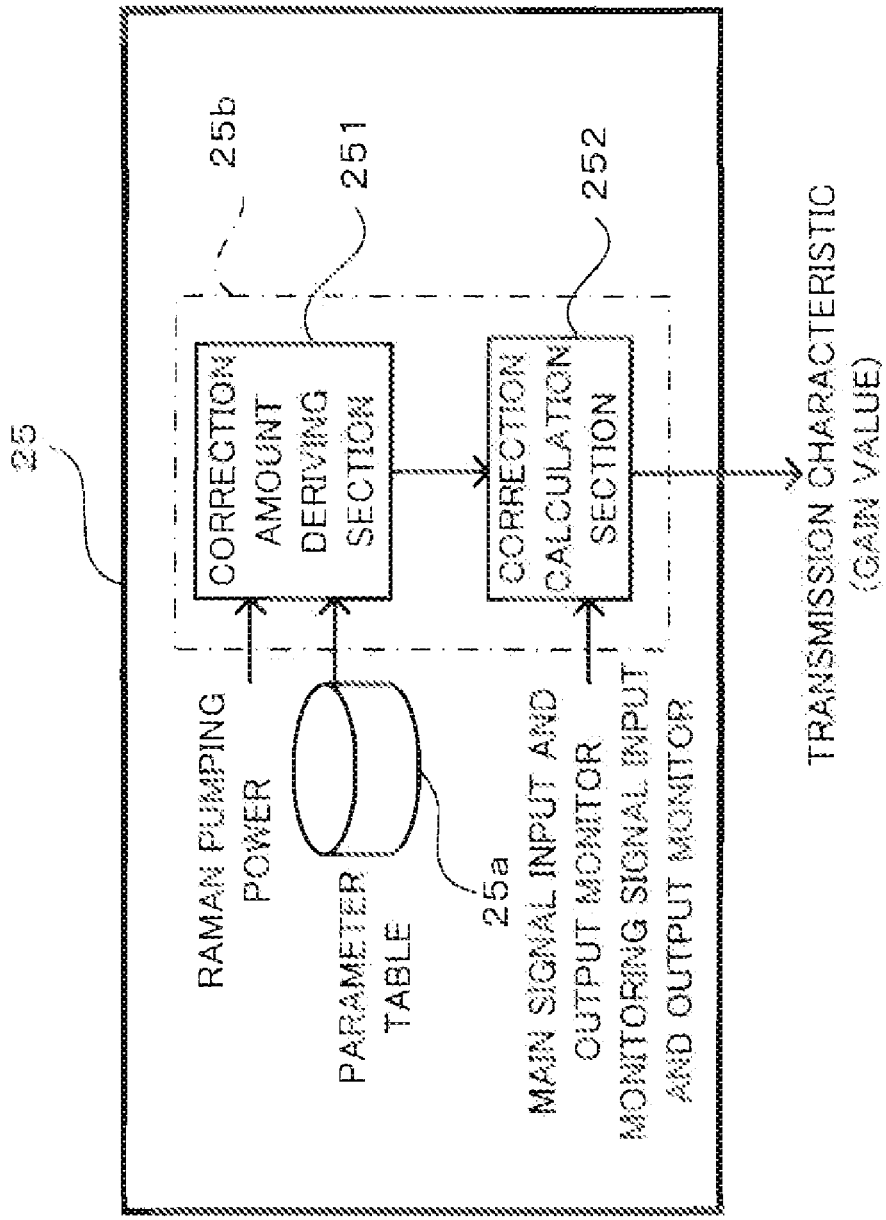
FIG. 4 is a view illustrating a calculation processing section in the first embodiment.

Therefore, in the calculation processing section 25 in the first embodiment, a correction amount for eliminating the error factors described above is applied when the gain value is calculated so that enhancement of the accuracy of the gain value to be derived is anticipated. In order to apply the correction amount described above to derive the gain value, the calculation processing section 25 includes a storage section 25a and a calculation section 25b, for example, as shown in FIG. 4.

Here, the storage section 25b functions as a function information storage section for storing function information for deriving a noise amount and a gain by the Raman amplification regarding light (monitoring signal wavelength light) having a wavelength of the optical monitoring signal with respect to the pumping light power supplied from the pumping light supplying section 21 and function information for deriving a noise amount by the Raman amplification regarding light having a wavelength of the main signal wavelength light with respect to the pumping light power. It is to be noted that the storage section 25b stores not only the function information described above but also information such as a physical constant of the optical transmission line 3 used for deriving the function information.

FIG. 5(a) is a view illustrating an example of a relationship of the noise generation amount generated on the main signal wavelength light or the monitoring signal wavelength light by the Raman pumping to the pumping light power supplied to the optical transmission line 3. As shown in FIG. 5(a), it can be decided that the noise amount generated in the main signal wavelength band or the monitoring signal wavelength band substantially has a proportional relationship to the pumping light power. It is to be noted that a function for deriving the noise amount generated in the main signal wavelength band by the pumping light power and another function for deriving the noise amount generated in the monitoring signal wavelength band are hereinafter referred to as first function and second function, respectively.

Meanwhile, with regard to the monitoring signal optical wavelength, it is assumed to fixedly utilize a comparatively narrow wavelength band different from the main signal wavelength, and also the gain wavelength characteristic of the monitoring signal wavelength light is free from fluctuation. Accordingly, also regarding the gain characteristic of the monitoring signal wavelength light, it can be decided that the Raman gain has a proportional relationship to the pumping light power, for example, as seen in FIG. 5(b). It is to be noted that a function for deriving the gain characteristic of the monitoring signal wavelength light from the pumping light power is hereinafter referred to as third function.

At this time, parameters such as an inclination for specifying the first to third functions for determining the noise amount and the gain where the pumping light power is used as a variable dominantly depend upon physical constants of an optical fiber (an effective cross-sectional area, a wavelength characteristic and so forth of a fiber core) which forms the optical transmission line 3, the coupling loss of pumping light emitted from the Raman pumping light source 21a (refer to FIG. 1) to the optical transmission line 3, and so forth.

Accordingly, when the optical transmission apparatus 2 is connected to the optical transmission line 3 and is installed, the calculation section 25b extracts not only a physical constant derived from the kind of the optical transmission line 3 to be connected but also information regarding the coupling loss described above from the storage section 25a. Then, the parameters for specifying the first to third functions described above are derived using the extracted information and the derived functions are stored into the storage section 25a.

Here, the calculation section 25b includes a correction amount derivation section 251 and a correction calculation section 252 in order to calculate a corrected Raman gain value using the function information stored in the storage section 25a in such a manner as described above. The correction amount derivation section 251 receives information regarding the pumping light power supplied from the pumping light supplying section 21 from the pumping light supplying section 21 and calculates, as a correction amount, the noise amount Psignoise of the main signal wavelength light and the noise amount Pscnoise and gain Gainsc of the monitoring signal wavelength light corresponding to the pumping light power while referring to the information of the first to third functions stored in the storage section 25a.

The correction calculation section 252 derives the corrected Raman gain value Gain_a in the main signal wavelength band, for example, as given by an expression (3) given below, by calculation using the values acquired as the monitor information described above (monitor values Psigo, Psigi, Psco and Psci of the transmission and reception levels of the main signal wavelength light and the monitoring signal wavelength light) and the correction amount derived by the correction amount derivation section 251. It is to be noted that Loss_a in the expression (3) represents the corrected transmission line loss, and the corrected transmission line loss can be calculated as given by an expression (4) given below.

$$\text{Gain}\_a = \text{Loss}\_a - \{Psigo - (Psigi - Psig\text{noise})\} \quad (3)$$

$$\text{Loss}\_a = Psco - (Psci - \text{Gain}sc - Psc\text{noise}) \quad (4)$$

In particular, if the expressions (1) and (2) given above and the expressions (3) and (4) are compared with each other, then the noise amount Psignoise of the monitoring signal light generated by the Raman pumping and the increment Gainsc by the gain of the monitoring signal light can be removed from a result derived from the expression (2) when the transmission line loss is derived. Further, when the gain value is derived, not only the noise amount Psignoise and the gain Gainsc described above but also the noise amount Psignoise in the main signal light wavelength band can be removed from a result derived from the expression (1). In this manner, with the first embodiment, the accuracy of the transmission line loss and the Raman gain to be derived can be enhanced (error can be decreased) in comparison with the accuracy where the expressions (1) and (2) are used.

Accordingly, the calculation section 25b described above functions not only as a main signal wavelength light level acquisition section and a monitoring signal wavelength light level acquisition section but also as a transmission characteristic derivation section for deriving the transmission characteristic of the optical transmission line 3 based on information acquired thereby as the main signal wavelength light level acquisition section and the monitoring signal wavelength light level acquisition section and the function information stored in the storage section 25b.

It is to be noted that the gain value calculated by the calculation section 25b is outputted to the control section 26. Consequently, the control section 26 can control the pumping light power from the pumping light supplying section 21 based on the gain value from the calculation section 25b so that the Raman gain value is stabilized. Accordingly, the control section 26 functions as a pumping light control section for controlling the pumping light to be supplied from the pumping light supplying section 21 so that the Raman gain derived by the calculation processing section 25 which forms the transmission characteristic derivation section is fixed.

Working Effect

By the configuration described above, in the first embodiment, the SN ratio of the optical main signal where the optical main signal is transmitted from the first optical transmission apparatus 1 to the second optical transmission apparatus 2 through the optical transmission line 3 is improved by Raman pumping the optical transmission line 3 in the Raman amplification apparatus 2A which forms the second optical transmission apparatus 2. At this time, in the Raman amplification apparatus 2A, since stabilized Raman amplification is implemented also by the fluctuation of the number of wavelengths by the calculation processing section 25 and the control section 26, the pumping light power is controlled so that the Raman gain is stabilized at a target value.

In particular, also in a state wherein the pumping light power is fluctuated as in the case of starting up of the apparatus or the like, the calculation processing section 25 can derive not only the noise amount in the optical monitoring signal wavelength band and the Raman gain corresponding to the supplied pumping light power using the second and third functions described above but also the noise amount in the main signal wavelength band using the first function. Therefore, also the Raman gain in the main signal wavelength band or the loss in the main signal wavelength band upon pumping light power fluctuation can be derived in accordance with the expressions (3) and (4). Consequently, the gain setting can be carried out such that the Raman pumping power is changed with high accuracy toward the target gain.

In this manner, with the first embodiment, in whichever state the pumping power in the second light transmission apparatus 2 is such as in an activated state or in a gain variation state, the noise amount corresponding to the pumping light power can be calculated as the transmission characteristic of the optical transmission line 3 by the calculation processing section 25 and the control section 26. Further, the value of the monitoring signal input monitor (reception level of the monitoring signal light) corrected in accordance with the calculated noise amount can be determined and then the Raman gain in the main signal wavelength band can be calculated with high accuracy based on the determined value of the monitoring signal input monitor. In particular, derivation of the Raman gain can be carried out with higher accuracy than that by the conventional techniques and the gain fixing control of the transmission line distributed Raman amplification can be carried out with higher accuracy than that by the conventional technique.

[A1] Description of Modifications to the First Embodiment

In the first embodiment described above, when the Raman amplification apparatus 2A is connected to the optical transmission line 3 and is installed as the optical transmission apparatus 2, the calculation section 25b extracts the physical constant derived from the kind of the optical transmission line 3 to be connected from the storage section 25a and derives the parameters such as an inclination for specifying the first to third functions.

Figure 6:
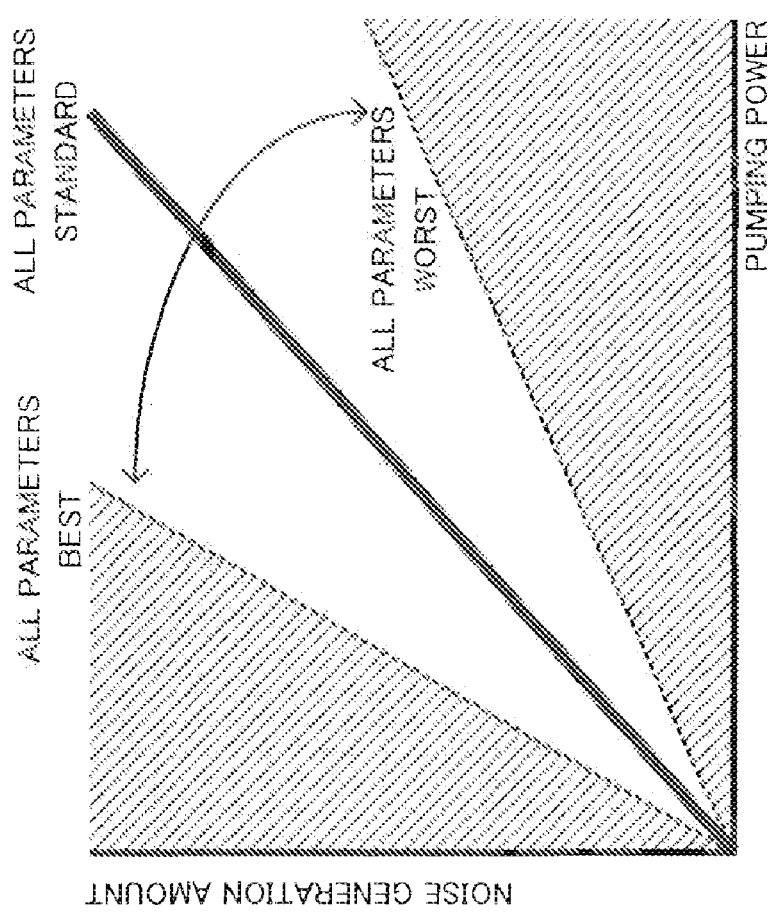
FIG. 6 is a view illustrating a first modification to the first embodiment.

On the other hand, in a first modification to the first embodiment, each of the physical constants of a transmission line fiber (effective cross-sectional area, wavelength characteristic and so forth of a fiber core) and the value of coupling loss between pumping light and the optical transmission line 3 which are dominant when the parameters for specifying the first to third functions are derived is defined as the center of a range to be assumed (function calculated from the standard of the distribution of each parameter) as shown in FIG. 6. Consequently, also in a case wherein information for specifying a physical constant such as a kind of a fiber or the like is unknown or in a different case wherein the value such as the value of coupling loss or the like is unknown, the difference can be suppressed to ½ or less in the maximum while uniquely defining the first to third functions. Therefore, the values of the functions with respect to the pumping light power can be derived with high accuracy.

Figure 7B:
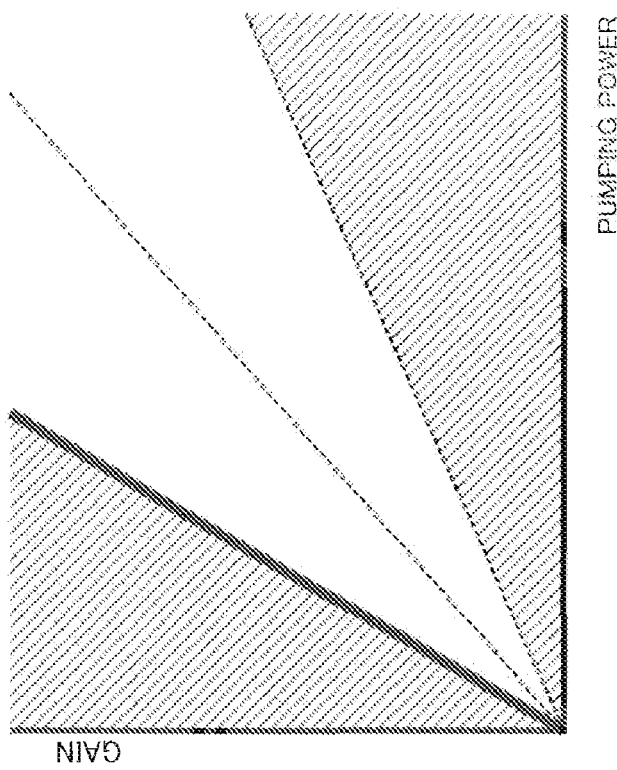
FIGS. 7(a) and 7(b) are views illustrating a second modification to the first embodiment.
Figure 7A:
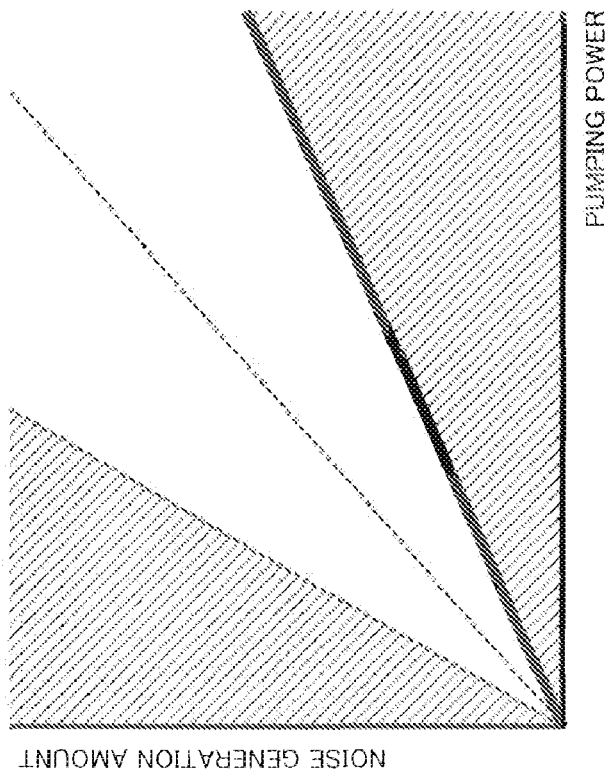

Meanwhile, in a second modification to the first embodiment, the parameters for specifying the first and second functions to be stored in the storage section 25a are defined as linear functions when the relationship between the Raman pumping power and the noise generation amount indicates an inclination whose coefficient is lowest within a range to be assumed as shown in FIG. 7(a). Consequently, for example, the value of "Pscnoise" used for correction of the input monitoring signal light level Psci (Psci−Gainsc−Pscnoise) becomes low. Also in this state, by defining the third function as a linear function when the relationship between the Raman pumping power and "Gainsc" indicates an inclination whose coefficient is highest within the range to be assumed, for example, as shown in FIG. 7(b), an error relating to the correction value for the input monitoring signal light level is offset between "Gainsce" and "Pscnoise" and the correction value can be derived as a Raman gain value having high accuracy. As a result, the Raman gain can be controlled normally.

At this time, while, where increase of the transmission line loss appears, the pumping power is controlled such that an increased amount of the transmission line loss is compensated for, the input monitoring line level still looks as a higher level than a normal level as described above. From this operation, the calculation error of the monitor circuit for detecting the input monitoring line level looks as an error lower than the signal level. As a result, the transmission line loss fluctuation can be detected with high accuracy.

[B] Description of the Second Embodiment

Figure 8:
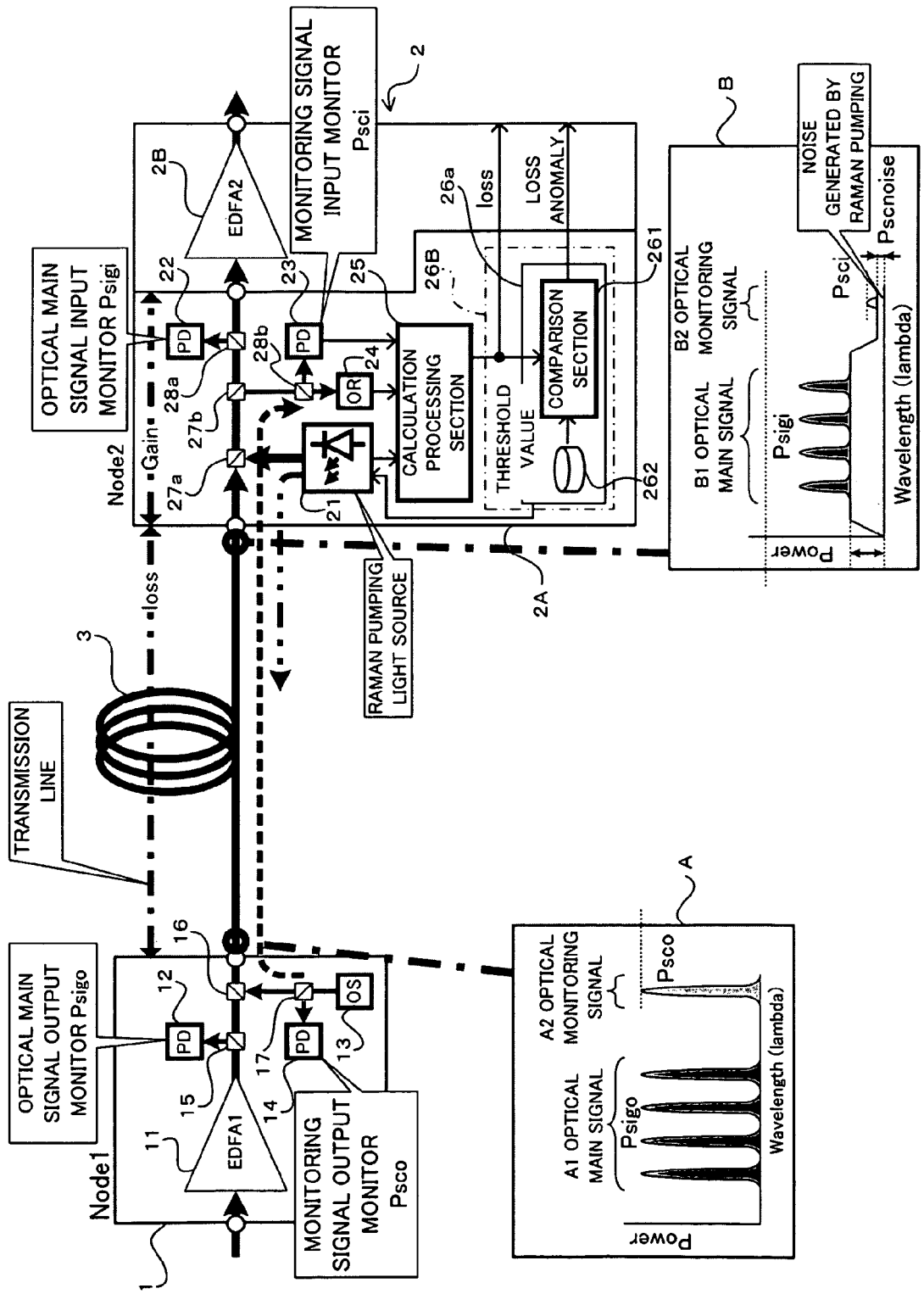
FIG. 8 is a view illustrating a distributed Raman amplification system according to a second embodiment.

FIG. 8 is a view illustrating a distributed Raman amplification system according to the second embodiment. The distributed Raman amplification system shown in FIG. 8 is different from that in the first embodiment described above (refer to FIG. 1) in that the control section 26B includes a loss anomaly outputting section 26a for outputting an alarm based on the value of the transmission line loss calculated by the calculation processing section 25. It is to be noted that the configuration of the other portions of the present embodiment is similar to that in the first embodiment described above and, in FIG. 8, like elements to those in FIG. 1 are denoted by like reference characters. It is to be noted that pumping light control similar to that by the first embodiment may be carried out.

The loss anomaly outputting section 26a includes a comparison section 261 and a threshold value storage section 262. The comparison section 261 can compare the value of the transmission line loss calculated by the calculation processing section 25 with the threshold value stored in the threshold value storage section 262 such that, where the value of the transmission line loss is higher than the threshold value, an alarm is outputted as an anomaly of the transmission line loss. Accordingly, the loss anomaly output section 26a included in the control section 26B functions as a loss anomaly decision section for deciding an anomaly of the loss characteristic derived by the calculation processing section 25 which configures the transmission characteristic derivation section.

Consequently, an advantage similar to that of the first embodiment described above can be achieved and an anomaly of the transmission line loss can be detected, and the apparatus performance can be enhanced.

[C] Description of the Third Embodiment

Figure 9:
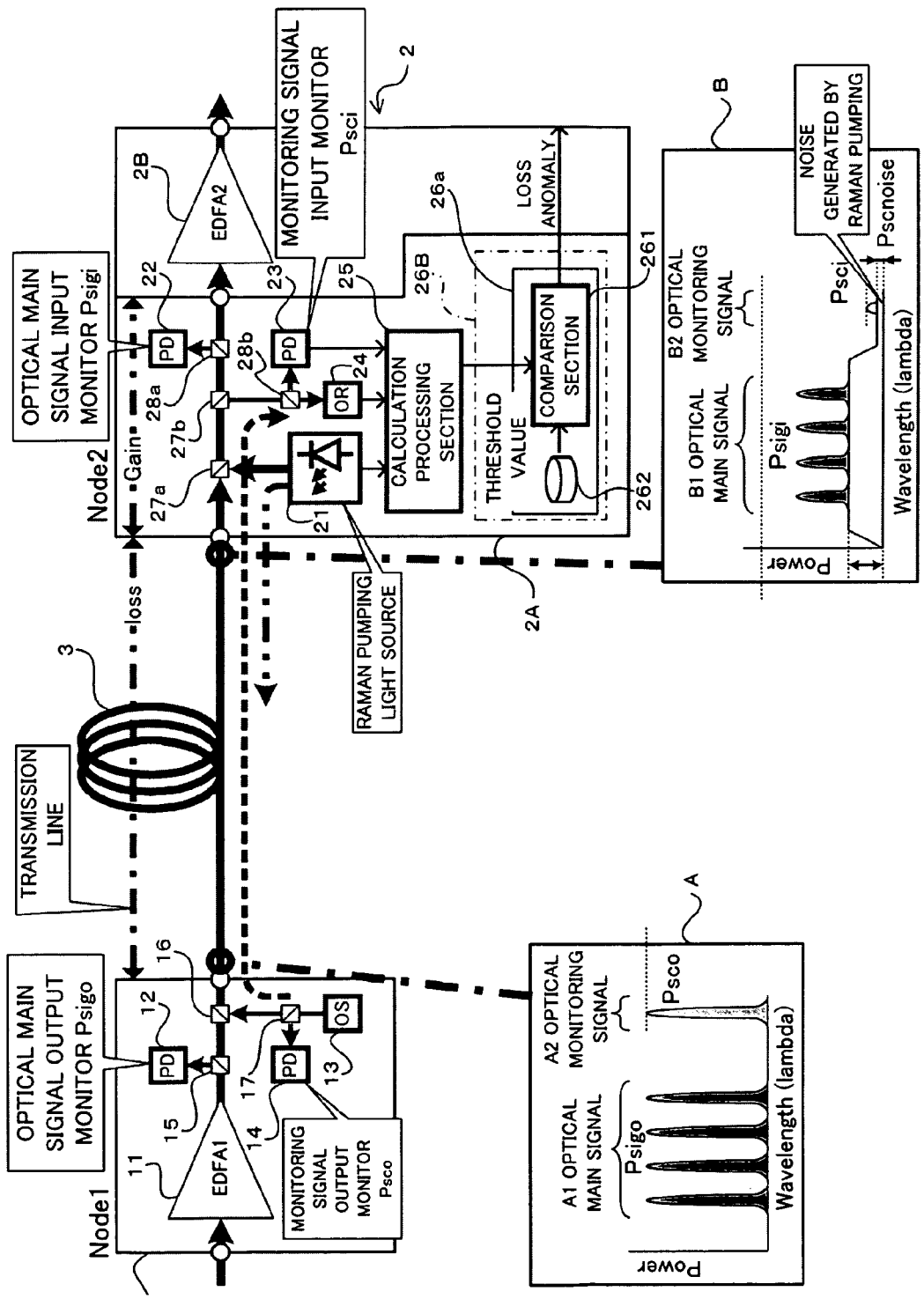
FIG. 9 is a view illustrating a distributed Raman amplification system according to a third embodiment.

FIG. 9 is a view illustrating a distributed Raman amplification system according to a third embodiment. The distributed Raman amplification system shown in FIG. 9 is different from that of the first embodiment in that the control section 26C includes a monitoring signal anomaly outputting section 26b for outputting an alarm as an anomaly of the optical monitoring signal based on the correction value of the reception level of the optical monitoring signal from the calculation processing section 25. It is to be noted that the configuration of the other portions is similar to that in the first embodiment described above and, in FIG. 9, like elements to those in FIG. 1 are denoted by like reference characters. It is to be noted that pumping light control similar to that in the first embodiment may be performed.

The monitoring signal anomaly outputting section 26b includes a comparison section 263 and a threshold value storage section 264. The comparison section 263 can compare the value of "Psci−Gainsc−Pscnoise" which is the correction value for the reception level of the optical monitoring signal calculated by the calculation processing section 25 with the threshold value stored in the threshold value storage section 264 so that, where the correction value is higher than the threshold value, an alarm is outputted as an anomaly of the optical monitoring signal line. Accordingly, the monitoring signal anomaly outputting section 26b included in the control section 26C functions as a monitoring signal anomaly decision section for deciding an anomaly of the correction value of the reception level of the monitoring signal wavelength light derived by the calculation processing section 25 which configures the transmission characteristic derivation section.

Consequently, an advantage similar to that of the first embodiment described above can be achieved and not only an anomaly of the correction value for the reception level of the monitoring signal wavelength light but also the anomaly of the monitoring signal line can be detected, and the apparatus performance can be enhanced.

[D] Description of the Fourth Embodiment

Figure 10:
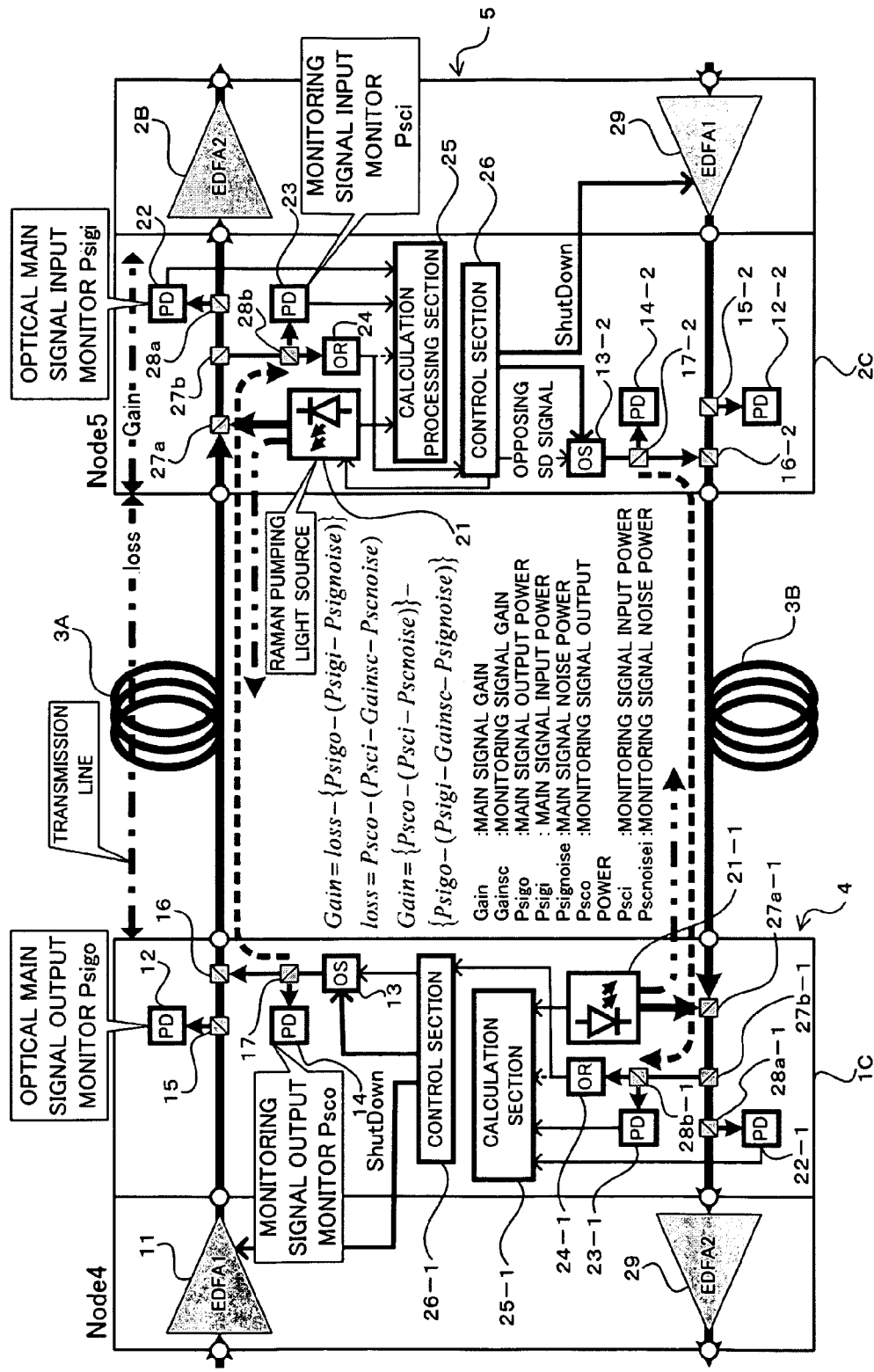
FIG. 10 is a view illustrating a distributed Raman amplification system according to a fourth embodiment.

FIG. 10 is a view illustrating a distributed Raman amplification system according to a fourth embodiment. The distributed Raman amplification system shown in FIG. 10 has a configuration for propagating the optical main signal and the optical monitoring signal bidirectionally between the first and second optical transmission apparatus 4 and 5. Therefore, the distributed Raman amplification system in the present embodiment includes an optical transmission line 3A for propagating the optical main signal and the optical monitoring signal in a direction from the first optical transmission apparatus 4 to the second optical transmission apparatus 5 and another optical transmission line 3B for propagating the optical main signal and the optical monitoring signal in a direction opposite to that of the optical transmission line 3A from the second optical transmission apparatus 5 to the first optical transmission apparatus 4.

Here, the first optical transmission apparatus 4 has a configuration (refer to reference numerals 11 to 17) for outputting light to the optical transmission line 3A as the configuration of the Raman amplification apparatus 1C similarly as in the optical transmission apparatus 1 in the first embodiment described above, and a configuration (refer to reference characters 21-1 to 26-1, 27a-1, 27b-1, 28a-1 and 28b-1) corresponding to that included in the optical transmission apparatus 2 of the first embodiment as a configuration for receiving the optical main signal and the optical monitoring signal inputted from the optical transmission line 3B in the opposite direction. It is to be noted that, in FIG. 10, the reference characters to which a branch character (−1) is not added individually denote the corresponding configurations which the second optical transmission apparatus 2 shown in FIG. 1 has.

Similarly, the second optical transmission apparatus 5 includes a configuration (refer to reference characters 21 to 26, 27a, 27b, 28a and 28b) for receiving and processing the light inputted through the optical transmission line 3A as the configuration of the Raman amplification apparatus 2C similarly as in the optical transmission apparatus 2 of the first embodiment described above, and a configuration (refer to reference numerals 11-2 to 17-2) corresponding to that included in the optical transmission apparatus 1 in the first embodiment as a configuration for outputting the optical main signal and the optical monitoring signal to the optical transmission line 3B in the opposite direction.

Here, the control section 26-1 in the optical transmission apparatus 4 and the control section 26 in the optical transmission apparatus 5 individually have a function for shutdown controlling of the operation of the optical amplifiers 11 and 11-2 which the optical transmission apparatus 4 and 5 have, respectively. It is to be noted that reference numerals 29 indicate optical amplifiers, in the optical transmission apparatus 4 and 5, for carrying out optical amplification for the optical main signal propagating along the optical transmission lines 3B and 3A in order to transmit the optical main signal to an external optical transmission line not shown.

Further, in the distributed Raman amplification system of the fourth embodiment, different from the first embodiment described above, the information of the first to third functions used when the Raman gain is derived in the calculation processing section 25 is determined through measurement before system operation (before communication of the optical main signal) and the determined function information is stored into the storage section 25b.

Figure 11:
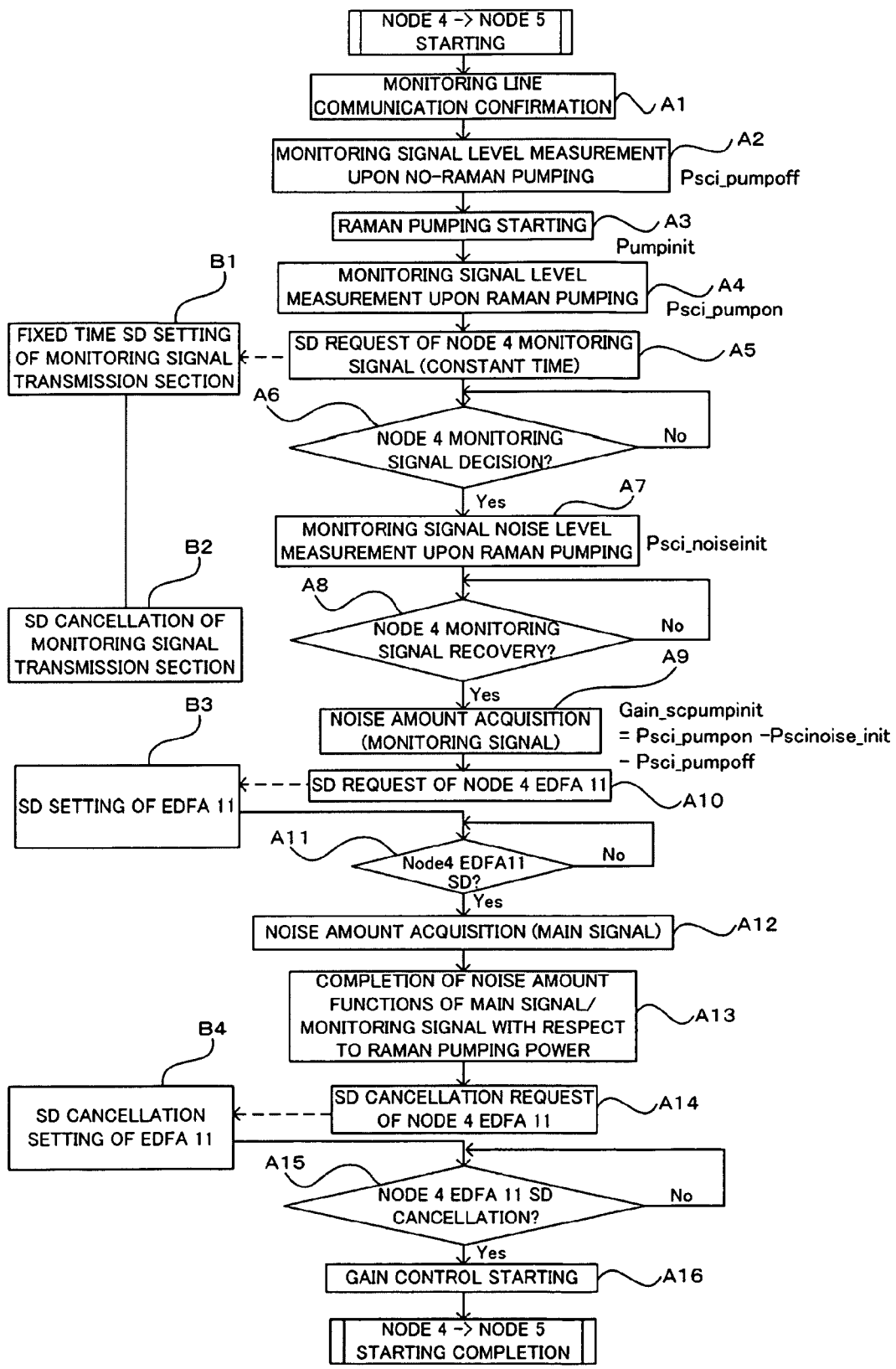
FIG. 11 is a flow chart illustrating a process for deriving a parameter for specifying first to third functions by measurement upon starting up of the distributed Raman amplification system shown in FIG. 10.

FIG. 11 is a flow chart illustrating a process for deriving parameters for specifying the first to third functions described above through measurement upon starting up of the distributed Raman amplification system shown in FIG. 10.

Upon starting up of an optical propagation path from the optical transmission apparatus 4 to the optical transmission apparatus 5 in the distributed Raman amplification system, communication of the optical monitoring signal from the first optical transmission apparatus 4 to the second optical transmission apparatus 5 is confirmed while supply of the pumping light from the pumping light supplying section 21 and propagation of the optical main signal from the first optical transmission apparatus 4 to the optical transmission line 3A are switched off as shown in FIG. 11 (step A1).

Then, the optical monitoring signal level when Raman pumping is not carried out is measured. In particular, the calculation processing section 25 in the second optical transmission apparatus 5 acquires the information regarding the transmission level Psco (from the first optical transmission apparatus 4) of the optical monitoring signal outputted from the first optical monitoring signal source 13 and the information regarding the reception level Psci_pumpoff (by the second optical transmission apparatus 5) (step A2).

Here, the transmission level described above is monitored by the monitoring signal output monitor 14 in the first optical transmission apparatus 4 and a result of the monitoring is modulated into the optical monitoring signal to be outputted from the first optical monitoring signal source 13 such that the modulated signal is outputted to the second optical transmission apparatus 5 through the optical transmission line 3A. The optical monitoring signal reception section 24 in the second optical transmission apparatus 5 demodulates the transmission level from the received optical monitoring signal. Consequently, the calculation processing section 25 acquires the information Psci_pumpoff regarding the transmission level demodulated by the optical monitoring signal reception section 24. Further, the calculation processing section 25 receives the monitoring result from the optical monitoring signal input monitor 23 to acquire the information Psco regarding the reception level described above.

Next, based on the pumping light control by the control section 26, supply of the pumping light Pumpinit from the pumping light supplying section 21 is turned on (step A3) and the calculation processing section 25 acquires the information regarding the transmission and reception levels Psco and Psci_pumpon of the optical monitoring signal outputted from the first optical monitoring signal source 13 (step A4). It is to be noted that, while the reception level Psci_pumpon is acquired from the monitoring result from the optical monitoring signal input monitor 23, where the transmission level does not fluctuate from the level information Psco before supplying of the pumping light, the value obtained from the level information Psco may be determined as an acquired level value of the transmission level.

Then, the output of the optical monitoring signal from the first optical monitoring signal source 13 is switched off for a fixed period of time and the calculation processing section 25 acquires monitoring signal wavelength components with regard to the noise amount from the optical transmission line 3A pumped by Raman pumping by the supply of the pumping light from the pumping light supplying section 21 within the fixed time period within which the output of the optical monitoring signal remains off. In particular, by the control by the control section 26, a request for interception of the output of the optical monitoring signal is outputted toward the first optical transmission apparatus 4 through the optical monitoring signal outputted from the second monitoring signal source 13-2 of the second optical transmission apparatus 5 (step A5). The optical monitoring signal from the second monitoring signal source 13-2 is propagated through the optical transmission line 3B and is received by the optical monitoring signal reception section 24-1 of the first optical transmission apparatus 4. Then, when the interception request described above reaches the control section 26-1, the control section 26-1 carried out interception control of the first optical monitoring signal source 13.

While, if the interception request to the first optical monitoring signal source 13 is received by the control section 26-1, then the control section 26-1 carries out the interception control for a fixed period of time, the outputting of the optical monitoring signal is resumed after the fixed time period passes (steps B1 and B2). In this manner, if the fact that the output of the optical monitoring signal from the first optical monitoring signal source 13 is intercepted is confirmed from the output from the optical monitoring signal reception section 24, then, within the fixed time period within which the output of the optical monitoring signal remains intercepted, the calculation processing section 25 acquires the optical monitoring signal wavelength components Psci_noiseinit of the noise light upon Raman pumping from the monitor value by the monitoring signal input monitor 23 (step A6 to A8).

Thereafter, the calculation processing section 25 determines the Raman gain Gain_scpumpinit in the optical monitoring signal wavelength band using the values Psci_pumpoff, Psci_pumpon and Psci_noiseinit acquired as the level information in such a manner as described above (step A9). It is to be noted that the Raman gain Gain_scpumpinit can be represented as given by the following expression (5).

$$\text{Gain}\_scpump\mathit{init} = Psci\_\text{pumpon} - Psci\_\text{noise}\mathit{init} - Psci\_\text{pumpoff} \tag{5}$$

Further, the optical amplifier 11 of the optical transmission apparatus 4 is controlled to an off state with the optical monitoring signal from the second optical monitoring signal source 13-2, and the calculation processing section 25 acquires main signal wavelength components regarding the noise amount from the optical transmission line 3A pumped by the Raman pumping by supply of the pumping light from the pumping light supplying section 21.

In particular, the second optical monitoring signal source 13-2 outputs the optical monitoring signal including request information for shutdown of the optical amplifier 11 in accordance with the request from the control section 26 (step A10). It is to be noted that the outputted optical monitoring signal is received by the optical monitoring signal reception section 24-1 of the first optical transmission apparatus 4 through the optical transmission line 3B and the request information included in the outputted optical monitoring signal reaches the control section 26-1. Consequently, the control section 26-1 carries out the shutdown control of the optical amplifier 11 so that the output of the optical main signal to be inputted to the optical transmission line 3 is switched off (step B3).

If the fact that the optical amplifier 11 is shut down is confirmed through the optical monitoring signal from the first optical monitoring signal source 13 or the like (step A11), then the calculation processing section 25 of the second optical transmission apparatus 5 acquires a main signal wavelength component Psignoise_init regarding the noise amount from the optical transmission line 3A caused by the Raman pumping by the pumping light from the pumping light supplying section 21 from the monitor value from the optical main signal input monitor 22 (step A12).

Then, the calculation section 25b (refer to FIG. 4) which forms the calculation processing section 25 determines functions for deriving the gain and the noise amount by the Raman pumping in the monitoring signal wavelength band with respect to the pumping light power supplied from the pumping light supplying section 21 based on the information Psco, Psci_pumpon and Psci_pumpoff regarding the transmission and reception levels of the optical monitoring signal and the noise amount Psci_noiseinit of the monitoring signal wavelength components acquired in such a manner as described above and stores the parameters for defining the functions as the function information into the function information storage section 25a (step A13).

Figure 12:
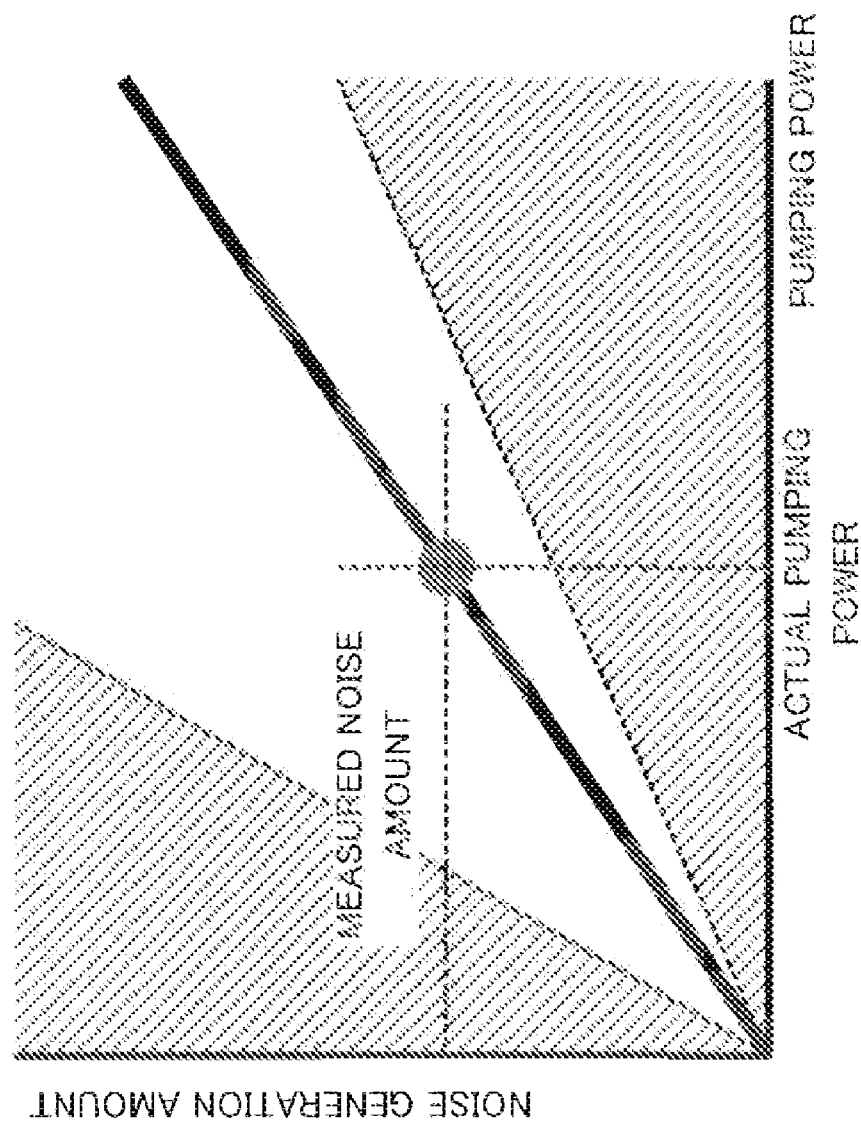
FIG. 12 is a view illustrating a process for deriving a parameter for specifying the first and second functions by measurement upon starting up of the distributed Raman amplification system shown in FIG. 10.

Since it can be considered that the noise amount of the monitoring signal wavelength components increases in direct proportion to the pumping light power supplied from the pumping light supplying section 21 as seen from FIG. 12, the second function for deriving the noise amount of the monitoring signal wavelength components with respect to the pumping light power can be specified as a linear function which passes the origin. Therefore, the calculation section 25b determines an inclination as the parameter for specifying the second function using the noise amount Psci_noiseinit with respect to the pumping light power applied as the initial value by the pumping light supplying section 21 and stores the determined inclination into the function information storage section 25a.

Similarly, it can be considered that also the Raman gain of the monitoring signal light wavelength components increases in direct proportion to the pumping light power. Accordingly, the calculation section 25b can specify also the third function for deriving the Raman gain of the monitoring signal wavelength components with respect to the pumping light power as a linear function which passes the origin. Therefore, also the inclination as the parameter for specifying the third function is determined using the Raman gain Gain_scpumpinit calculated with respect to the pumping light power as the initial value and the information of the determined inclination is stored into the function information storage section 25a.

Further, since it can be determined that also the noise amount of the main signal wavelength components increases in direct proportion to the pumping light power supplied from the pumping light supplying section 21 as seen from FIG. 12, also the first function for deriving the noise amount of the main signal wavelength components with respect to the pumping light power can be specified as a linear function which passes the origin. Therefore, the calculation section 25b determines the inclination as the parameter for specifying the first function using the noise amount Psci_noiseinit (refer to the expression (5)) with respect to the pumping light power applied as the initial value by the pumping light supplying section 21 and stores the determined inclination into the function information storage section 25a.

After the parameters for specifying the first to third functions are stored into the storage section 25 in this manner, the control section 26 outputs a request for cancellation of the shutdown of the optical amplifier 11 through an optical monitoring signal line configured from the optical monitoring signal source 13-2, optical transmission line 3B and monitoring signal reception section 24-1 (step A14). If control of the optical amplifier 11 is carried out in accordance with the cancellation request by the control section 26-1 of the first optical transmission apparatus 4 (step B4) and confirmation of the control of the optical amplifier 11 just described is completed in the control section 26 of the second optical transmission apparatus 5 (step A15), then the processing advances to fixing control of the Raman gain on the optical transmission line 3A in preparation for routing of the optical main signal (step A16), whereby the starting up of the optical propagation path from the optical transmission apparatus 4 to the optical transmission apparatus 5 is completed.

By the configuration described above, in the fourth embodiment, where the optical main signal is transmitted from the first optical transmission apparatus 4 to the second optical transmission apparatus 5 through the optical transmission line 3A, the optical transmission line 3A is Raman pumped in the Raman amplification apparatus 2C which forms the second optical transmission apparatus 5 such that the SN ratio of the optical main signal is improved. At this time, since, in the Raman amplification apparatus 2C, the Raman amplification is implemented in stability also with fluctuation of the number of wavelengths by the calculation processing section 25 and the control section 26, the pumping light power is controlled so that the Raman gain is stabilized at a target value.

In particular, also in a state wherein the pumping light power is being fluctuated such as a state upon starting up of the apparatus or the like, the calculation processing section 25 can derive the noise amount and the Raman gain in the optical monitoring signal wavelength band corresponding to supplied pumping light power using the second and third functions described above and obtained by such calculation upon starting up as described and besides can derive also the noise amount in the main signal wavelength band using the first function obtained by such calculation upon starting up as described above. Accordingly, also the Raman gain in the main signal wavelength band or the loss in the main signal wavelength band upon fluctuation of the pumping light power can be derived in accordance with the expressions (3) and (4). Consequently, the Raman pumping power can be changed to carry out gain setting with high accuracy toward the target gain.

In this manner, also with the fourth embodiment, an advantage similar to that in the case of the first embodiment described above can be obtained.

[E] Others

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has (have) been described in detail, it should be understood that the various changes, substitutions, and alterations could be made hereto without departing from the spirit and scope of the invention.

What is claimed is:

1. A Raman amplification apparatus for Raman-amplifying light propagating along an optical transmission line, the Raman amplification apparatus comprising:
    a pump light source to supply pump light for the Raman amplification to said optical transmission line;
    a first signal wavelength light monitor to monitor first information regarding transmission and reception levels of first signal wavelength light transmitted along said optical transmission line;
    a second signal wavelength light monitor to monitor second information regarding transmission and reception levels of second signal wavelength light having a wavelength different from that of the first signal wavelength light and transmitted in the same direction as the first signal wavelength light along said optical transmission line, and the second signal wavelength light is monitor signal wavelength light;
    a memory to store first function information relating to functions for deriving a noise amount and a gain by the Raman amplification regarding the second signal wavelength light with respect to pumping light power supplied from said pump light source; and
    a calculator to derive a transmission characteristic of said optical transmission line based on the first information acquired by said first signal wavelength light monitor, the first information acquired by said second signal wavelength light monitor, and the first function information stored in said memory.

2. The Raman amplification apparatus as claimed in claim 1, wherein the first function information stored by said memory are derived in response to a physical constant of said optical transmission line and a coupling coefficient of the pump light from said pump light source to said optical transmission line.

3. The Raman amplification apparatus as claimed in claim 1, wherein said memory also stores second function information of a function for deriving a noise amount by the Raman amplification regarding the first signal wavelength light with respect to the pumping light power supplied from said pump light source, and
    said calculator derives, as the transmission characteristic, a Raman gain of the first signal wavelength light corresponding to the power of the pump light supplied from said pump light source based on the function information stored in said memory.

4. The Raman amplification apparatus as claimed in claim 3, wherein calculator derives a noise amount and a gain by the Raman amplification regarding the second signal wavelength light corresponding to the pump light power supplied from said pump light source based on the function information stored in said memory, and derives the Raman gain using the first information acquired by said first signal wavelength light monitor and said second signal wavelength light monitor together with the noise amount and the gain.

5. The Raman amplification apparatus as claimed in claim 3, further comprising a pump light controller that controls the pump light to be supplied from said pump light source such that the Raman gain derived by said calculator is fixed.

6. The Raman amplification apparatus as claimed in claim 1, wherein said calculator derives a loss characteristic of said optical transmission line as the transmission characteristic.

7. The Raman amplification apparatus as claimed in claim 6, wherein said calculator derives a noise amount and a gain by the Raman amplification regarding the second signal wavelength light corresponding to the pump light power supplied from said pump light source based on the function information stored in said memory, and derives the loss characteristic based on the second information acquired by said second signal wavelength light level monitor together with the noise amount and the gain.

8. The Raman amplification apparatus as claimed in claim 6, further comprising a loss anomaly decision section configured to decide anomaly in the loss characteristic derived by said calculator.

9. The Raman amplification apparatus as claimed in claim 1, wherein said calculator derives a correction value by correcting the reception level of the second signal wavelength light acquired by said second signal wavelength light monitor based on the function information stored in said memory,
said Raman amplification apparatus further comprising a second signal anomaly decision section that decides anomaly in a correction value of the reception level of the second signal wavelength light derived by said calculator.

10. A distributed Raman amplification system, comprising:
an optical transmission line; and
first and second optical transmission apparatus connected to one end side and the other end side of said optical transmission line, respectively;
said distributed Raman amplification system distributed Raman-amplifying light propagating along said optical transmission line;
said first optical transmission apparatus including:
a first optical signal source to output an optical first signal whose wavelength is set to the outside of a wavelength band of an optical second signal and which is to be transmitted to said second optical transmission apparatus along said optical transmission line; and
a first optical monitor to monitor power of the optical second signal transmitted from said first optical transmission apparatus and inputted to said optical transmission line and the optical first signal outputted from said first optical signal source;
said second optical transmission apparatus including a second optical monitor to monitor power of the optical second signal and the optical first signal, in the optical wavelength band, inputted to and received by said second optical transmission apparatus through said optical transmission line;
one or both of said first and second optical transmission apparatus including a pump light source that supplies pump light for the distributed Raman amplification to said optical transmission line;
one of said first and second optical transmission apparatus including:
a second signal wavelength light monitor to acquire information regarding transmission and reception levels of second signal wavelength light transmitted along said optical transmission line between said first and second optical transmission apparatus based on a result of the monitoring from said first and second optical monitors;
a first signal wavelength light monitor to acquire information regarding transmission and reception levels of the first signal wavelength light having a wavelength different from that of the second signal wavelength light and transmitted along said optical transmission line between said first and section optical transmission apparatus based on monitoring results from said first and second optical monitors;
a memory to store function information for deriving a noise amount and a gain by the Raman amplification regarding the first signal wavelength light with respect to pump light power supplied from said pump light source; and
a calculator to derive a transmission characteristic of said optical transmission line based on the information acquired by said second signal wavelength light monitor and said first signal wavelength light monitor and the function information stored in said memory.

11. The distributed Raman amplification system as claimed in claim 10, wherein said second optical transmission apparatus includes a second optical signal source that outputs an optical first signal whose wavelength is set to the outside of a wavelength band of the optical second signal and which is to be transmitted to said first optical transmission apparatus;
said first optical monitor including an optical amplifier provided on the input side and adapted to amplify the inputted optical second signal, said optical amplifier being configured to be capable of being controlled between on and off in accordance with the optical first signal from the second optical signal source.

12. A starting up method for the distributed Raman amplification system as claimed in claim 11, the starting up method comprising:
switching off supply of the pump light from the pump light source and propagation of the optical first signal from the first optical transmission apparatus to the optical transmission line and acquiring the information regarding the transmission and reception levels of the optical second signal outputted from the first optical signal source by first signal wavelength light monitor;
switching on the supply of the pump light from the pump light source and acquiring the information regarding levels of the optical second signal outputted from the first optical signal source by the first signal wavelength light monitor;
switching off the output of the optical second signal from the first optical signal source for a fixed period of time and acquiring second signal wavelength components with regard to the noise amount from the optical transmission line caused by the Raman pump upon the supply of the pump light from the pump light source within the fixed time period by the first signal wavelength light monitor;
controlling the optical amplifier to off in response to the optical second signal from the second optical signal source;

acquiring first signal wavelength components with regard to the noise amount from the optical transmission line caused by the Raman pump upon the supply of the pump light from the pump light source by the first signal wavelength light monitor;

determining functions for deriving the noise amount and the gain by the Raman amplification in a monitoring signal wavelength band with respect to the pump light power supplied from the pump light source based on the acquired information regarding the transmission and reception levels of the optical second signal and the acquired noise amount of the second signal wavelength components and storing parameters for defining the functions as the function information into the memory; and determining a function for deriving the noise amount by the Raman amplification in the first signal wavelength band with respect to the pump light power supplied from the pump light source based on the acquired noise amount of the first signal wavelength components and storing a parameter for defining the function as the function information into the memory.

* * * * *